(12) United States Patent
Farre Guiu et al.

(10) Patent No.: US 10,057,644 B1
(45) Date of Patent: Aug. 21, 2018

(54) VIDEO ASSET CLASSIFICATION

(71) Applicant: Disney Enterprises, Inc., Burbank, CA (US)

(72) Inventors: Miquel Angel Farre Guiu, Bern (CH); Matthew Petrillo, Sandy Hook, CT (US); Monica Alfaro Vendrell, Barcelona (ES); Pablo Beltran Sanchidrian, Barcelona (ES); Marc Junyent Martin, Barcelona (ES); Avner Swerdlow, Los Angeles, CA (US); Katharine S. Ettinger, Santa Monica, CA (US); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/498,309

(22) Filed: Apr. 26, 2017

(51) Int. Cl.
| | |
|---|---|
| *H04N 7/16* | (2011.01) |
| *H04N 21/45* | (2011.01) |
| *H04N 21/435* | (2011.01) |
| *H04N 21/44* | (2011.01) |

(52) U.S. Cl.
CPC ....... *H04N 21/4516* (2013.01); *H04N 21/435* (2013.01); *H04N 21/44008* (2013.01)

(58) Field of Classification Search
CPC ......... H04N 21/4516; H04N 21/44008; H04N 21/435
USPC ........................................................ 725/139
See application file for complete search history.

(56) References Cited

U.S. PATENT DOCUMENTS

| | | | | |
|---|---|---|---|---|
| 7,375,731 | B2* | 5/2008 | Divakaran | G06F 17/30787 345/581 |
| 7,606,425 | B2* | 10/2009 | Bazakos | G06K 9/00335 348/143 |
| 8,208,694 | B2* | 6/2012 | Jelonek | G06F 17/30265 382/117 |
| 8,737,817 | B1* | 5/2014 | Izo | H04N 5/76 386/287 |
| 8,769,556 | B2* | 7/2014 | Guo | G06K 9/00677 382/118 |
| 9,807,472 | B1* | 10/2017 | Cox | H04N 21/84 |
| 2002/0184098 | A1* | 12/2002 | Giraud | G06Q 30/02 705/14.66 |
| 2002/0186867 | A1* | 12/2002 | Gutta | G06F 17/30017 382/116 |
| 2005/0080671 | A1* | 4/2005 | Giraud | G06Q 30/02 705/14.66 |

(Continued)

*Primary Examiner* — Michael B Pierorazio
(74) *Attorney, Agent, or Firm* — Farjami & Farjami LLP

(57) ABSTRACT

According to one implementation, a content classification system includes a computing platform having a hardware processor and a system memory storing a video asset classification software code. The hardware processor executes the video asset classification software code to receive video clips depicting video assets and each including images and annotation metadata, and to preliminarily classify the images with one or more of the video assets to produce image clusters. The hardware processor further executes the video asset classification software code to identify key features data corresponding respectively to each image cluster, to segregate the image clusters into image super-clusters based on the key feature data, and to uniquely identify each of at least some of the image super-clusters with one of the video assets.

20 Claims, 4 Drawing Sheets

(56) References Cited

U.S. PATENT DOCUMENTS

| | | | |
|---|---|---|---|
| 2006/0053342 A1* | 3/2006 | Bazakos | G06K 9/00335 714/37 |
| 2008/0002892 A1* | 1/2008 | Jelonek | G06F 17/30265 382/224 |
| 2009/0116695 A1* | 5/2009 | Anchyshkin | G06K 9/00221 382/106 |
| 2009/0133051 A1* | 5/2009 | Hildreth | H04N 5/4403 725/28 |
| 2009/0196464 A1* | 8/2009 | Dimitrova | G06K 9/00295 382/118 |
| 2009/0210902 A1* | 8/2009 | Slaney | H04H 60/45 725/34 |
| 2009/0217315 A1* | 8/2009 | Malik | G06K 9/00362 725/9 |
| 2009/0285454 A1* | 11/2009 | Xu | G06K 9/00221 382/118 |
| 2010/0007726 A1* | 1/2010 | Barbieri | G06K 9/00221 348/78 |
| 2010/0008547 A1* | 1/2010 | Yagnik | G06F 17/30781 382/118 |
| 2010/0067745 A1* | 3/2010 | Kovtun, IV | G06K 9/00711 382/106 |
| 2010/0141787 A1* | 6/2010 | Bigioi | G06K 9/00228 348/222.1 |
| 2010/0299210 A1* | 11/2010 | Giraud | G06Q 30/02 705/14.66 |
| 2011/0052012 A1* | 3/2011 | Bambha | G06F 17/30256 382/118 |
| 2011/0129126 A1* | 6/2011 | Begeja | G06K 9/00295 382/118 |
| 2011/0150295 A1* | 6/2011 | Eckhoff | G06Q 30/02 382/118 |
| 2011/0150296 A1* | 6/2011 | Eckhoff | G06Q 30/02 382/118 |
| 2011/0150297 A1* | 6/2011 | Eckhoff | G06K 9/00288 382/118 |
| 2011/0150298 A1* | 6/2011 | Eckhoff | G06Q 30/02 382/118 |
| 2011/0150299 A1* | 6/2011 | Eckhoff | G06Q 30/02 382/118 |
| 2011/0231757 A1* | 9/2011 | Haddick | G02B 27/017 715/702 |
| 2012/0072936 A1* | 3/2012 | Small | G06Q 30/00 725/10 |
| 2013/0036011 A1* | 2/2013 | Roberts | G06Q 30/0251 705/14.58 |

* cited by examiner

VIDEO ASSET CLASSIFICATION

BACKGROUND

Video has for some time been, and continues to be a highly popular medium for the enjoyment of entertainment content in the form of movie, television, and sports content, for example, as well as for information content such as news. Due to its popularity with consumers, ever more video content is being produced and made available for distribution. Consequently, the accuracy and efficiency with which video content can be reviewed, classified, archived, and managed has become increasingly important to producers, owners, and distributors of such content. For example, techniques for automating the classification of video content based on features or images included in the video, may reduce the time spent in video production and management.

Unfortunately, conventional approaches to automating video classification typically require initial datasets that may be costly and time consuming to prepare. For example, conventional approaches to classifying video content based on image recognition require that collections of precisely labeled images be prepared as an initial input for comparative purposes.

SUMMARY

There are provided video asset classification systems and methods, substantially as shown in and/or described in connection with at least one of the figures, and as set forth more completely in the claims.

DETAILED DESCRIPTION

Figure 1:
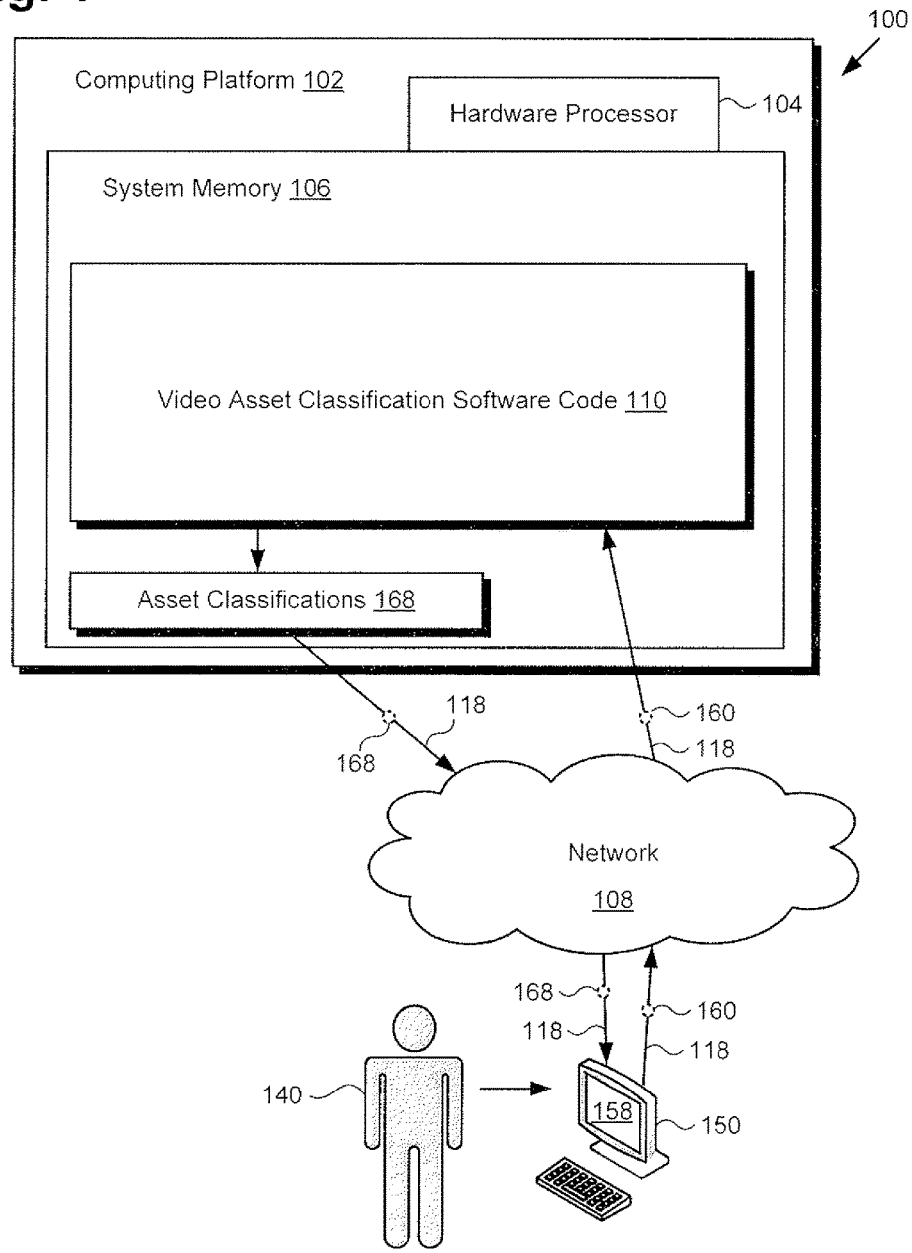
FIG. 1 shows a diagram of an exemplary content classification system for performing video asset classification, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, video continues to be a highly popular medium for the enjoyment of entertainment and information content. Due to that popularity, ever more video content is being produced and made available for distribution to consumers. Consequently, the accuracy and efficiency with which video content can be reviewed, classified, archived, and managed has become increasingly important to producers, owners, and distributors of such content.

As also stated above, conventional approaches to automating video classification typically require initial datasets that may be costly and time consuming to prepare. For example, conventional approaches to classifying video content based on image recognition require that collections of precisely labeled images be prepared as an initial input for comparative purposes. Thus, there is a need for a solution capable of substantially automating the generation of data sets for use in video content classification.

The present application discloses a video asset classification solution that overcomes the drawbacks and disadvantages in the conventional art. By enabling use of a sparse annotated data set as an initial input, such as a data set identifying a video clip in terms of a start time stamp, an end time stamp, and specific video assets depicted in the video clip, the present solution can substantially reduce the cost and time required to initiate video asset classification. Moreover, by preliminarily classifying images included in the video clips with one or more of the video assets to produce image clusters, identifying key feature data for each image cluster, and segregating the image clusters into image super-clusters based on the key feature data, the present solution advantageously enables a reliable convergence to an accurate classification of video assets.

FIG. 1 shows a diagram of one exemplary implementation of a content classification system for performing video asset classification. As shown in FIG. 1, content classification system 100 includes computing platform 102 having hardware processor 104, and system memory 106 implemented as a non-transitory storage device. According to the present exemplary implementation, system memory 106 stores video asset classification software code 110.

As further shown in FIG. 1, content classification system 100 is implemented within a use environment including communication network 108, user device 150 including display 158, and user 140 utilizing user device 150. Also shown in FIG. 1 are network communication links 118 interactively connecting user device 150 and content classification system 100 via communication network 108, video clips 160, and video asset classifications 168 generated using video asset classification software code 110.

It is noted that although FIG. 1 depicts video asset classification software code 110 as being stored in its entirety in memory 106, that representation is merely provided as an aid to conceptual clarity. More generally, content classification system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within content classification system 100. Thus, it is to be understood that various portions of video asset classification software code 110, such as one or more of the features described below by reference to FIG. 4, may be stored and/or executed using the distributed memory and/or processor resources of content classification system 100.

According to the implementation shown by FIG. 1, user 140 may utilize user device 150 to interact with content classification system 100 over communication network 108. In one such implementation, content classification system 100 may correspond to one or more web servers, accessible over a packet network such as the Internet, for example. Alternatively, content classification system 100 may correspond to one or more computer servers supporting a local area network (LAN), or included in another type of limited distribution network.

Although user device 150 is shown as a personal computer (PC) in FIG. 1, that representation is also provided merely as an example. In other implementations, user device 150 may be any other suitable mobile or stationary computing device or system. For example, in other implementations, user device 150 may take the form of a laptop computer, tablet computer, or smartphone, for example. User 140 may utilize user device 150 to interact with content classification system 100 to use video asset classification software code 110, executed by hardware processor 104, to generate video asset classifications 168.

It is noted that, in various implementations, video asset classifications 168, when generated using video asset classification software code 110, may be stored in system memory 106 and/or may be copied to non-volatile storage (not shown in FIG. 1). Alternatively, or in addition, as shown in FIG. 1, in some implementations, video asset classifications 168 may be sent to user device 150 including display 158, for example by being transferred via network communication links 118 of communication network 108. It is further noted that display 158 may take the form of a liquid crystal display (LCD), a light-emitting diode (LED) display, an organic light-emitting diode (OLED) display, or another suitable display screen that performs a physical transformation of signals to light.

Figure 2:
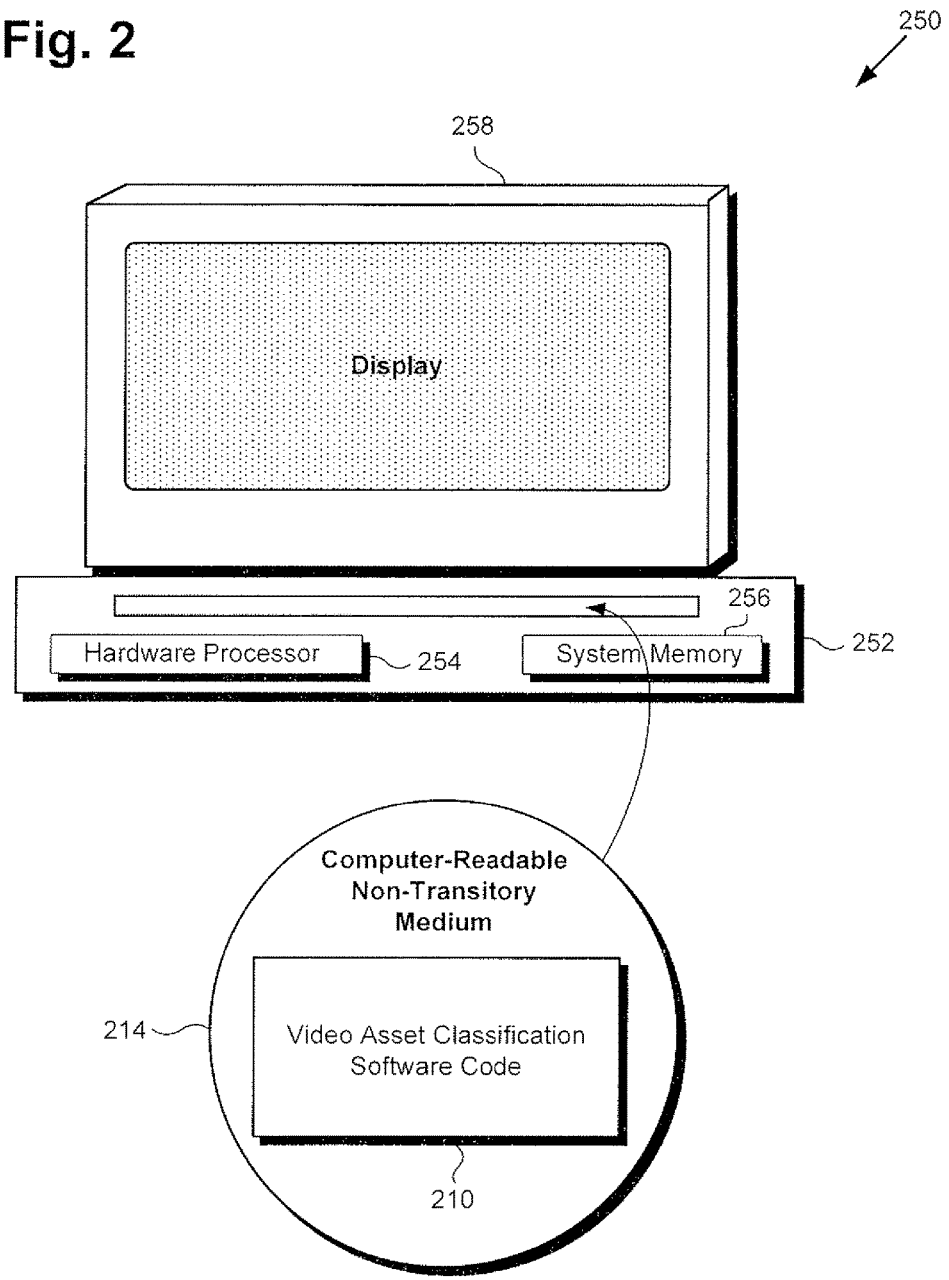
FIG. 2 shows an exemplary system and a computer-readable non-transitory medium including instructions for performing video asset classification, according to one implementation.

FIG. 2 shows exemplary system 250 and computer-readable non-transitory medium 214 including instructions for performing video asset classification, according to one implementation. System 250 includes computer 252 having hardware processor 254 and system memory 256, interactively linked to display 258. Display 258 may take the form of an LCD, LED display, an OLED display, or another suitable display screen that performs a physical transformation of signals to light. System 250 including computer 252 having hardware processor 254 and system memory 256 corresponds in general to content classification system 100 including computing platform 102 having hardware processor 104 and system memory 106, in FIG. 1. Consequently, system 250 may share any of the characteristics attributed to corresponding content classification system 100 by the present disclosure.

Also shown in FIG. 2 is computer-readable non-transitory medium 214 having video asset classification software code 210 stored thereon. The expression "computer-readable non-transitory medium," as used in the present application, refers to any medium, excluding a carrier wave or other transitory signal, that provides instructions to hardware processor 254 of computer 252. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 214 provides video asset classification software code 210 for execution by hardware processor 254 of computer 252. Video asset classification software code 210 corresponds in general to video asset classification software code 110, in FIG. 1, and is capable of performing all of the operations attributed to that corresponding feature by the present disclosure.

Figure 3:
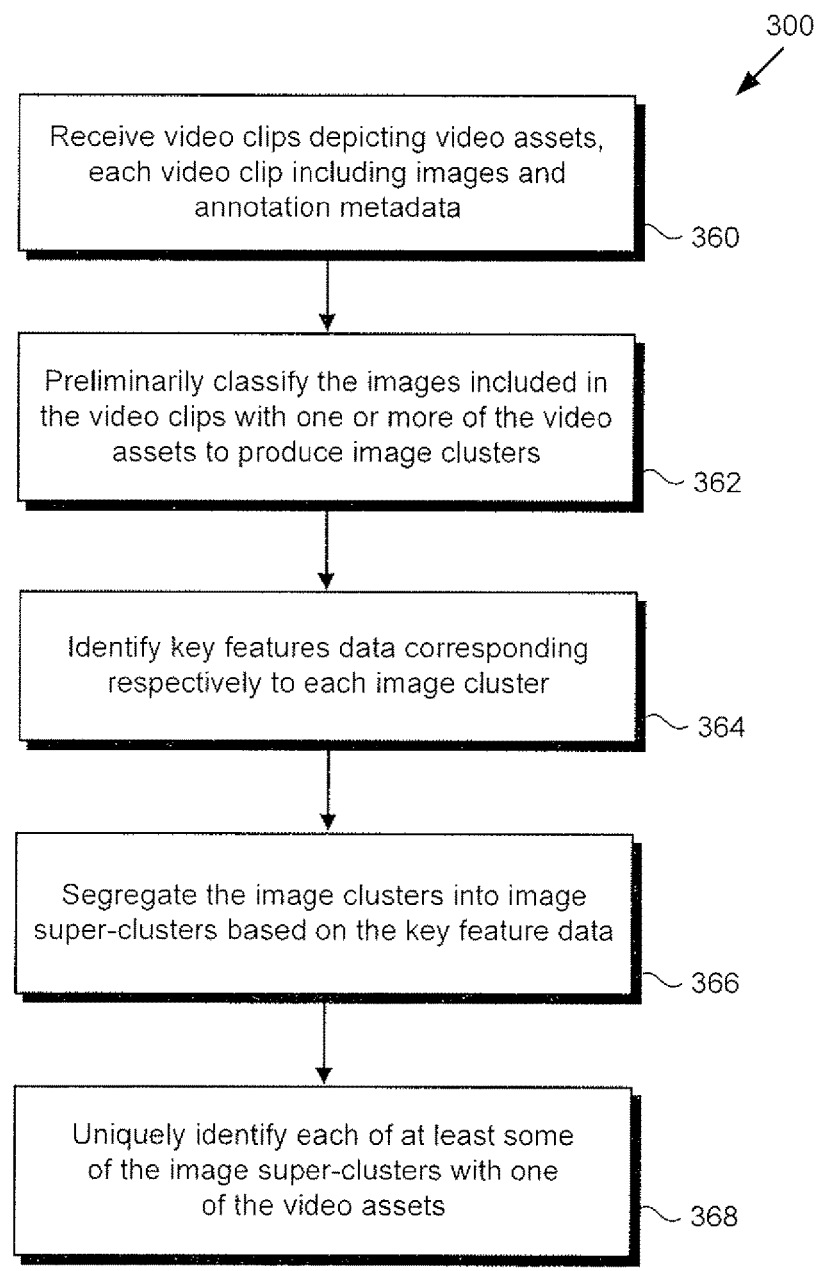
FIG. 3 shows a flowchart presenting an exemplary method for performing video asset classification, according to one implementation.

The functionality of video asset classification software code 110/210 will be further described by reference to FIG. 3 in combination with FIGS. 1, 2, and 4. FIG. 3 shows flowchart 300 presenting an exemplary method for use by a system, such as content classification system 100, in FIG. 1, or system 250, in FIG. 2, to perform video asset classification. With respect to the method outlined in FIG. 3, it is noted that certain details and features have been left out of flowchart 300 in order not to obscure the discussion of the inventive features in the present application.

Figure 4:
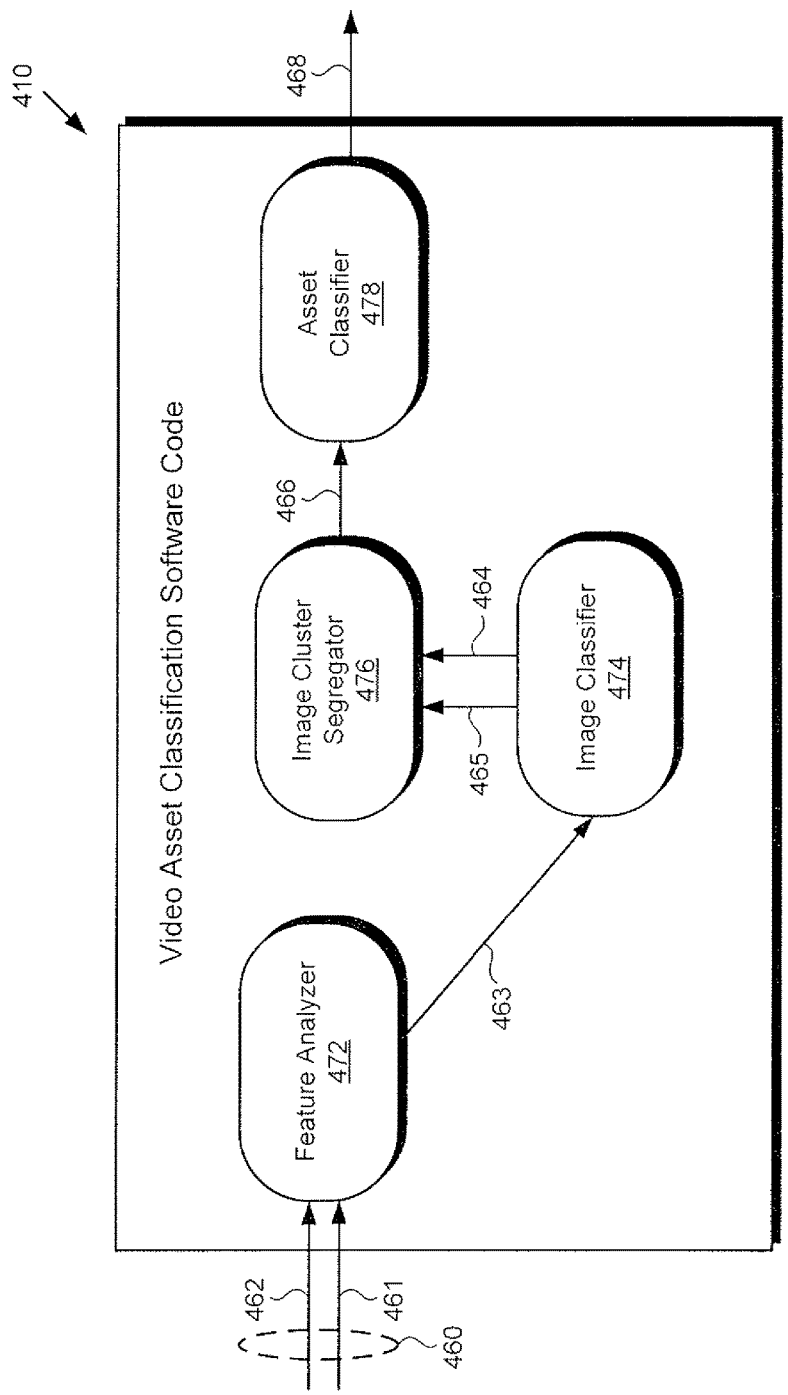
FIG. 4 shows an exemplary diagram of a video asset classification software code suitable for execution by a hardware processor of the systems shown by FIGS. 1 and 2, according to one implementation.

FIG. 4 shows exemplary video asset classification software code 410 suitable for execution by a hardware processor of the systems shown by FIGS. 1 and 2, according to one implementation. As shown in FIG. 4, video asset classification software code 410 may include feature analyzer 472, image classifier 474, image cluster segregator 476, and asset classifier 478. Also shown in FIG. 4 are video clips 460, each including annotation metadata 461 and video segments 462, images 463, image clusters 464, key features data 465, image super-clusters 466, and video asset classifications 468.

Video clips 460 and video asset classifications 468 correspond respectively in general to video clips 160 and video asset classifications 168, in FIG. 1, and may share any of the characteristics attributed to those corresponding features by the present disclosure. In other words, like video clips 460, each of video clips 160 may include annotation metadata corresponding to annotation metadata 461, and video segments corresponding to video segments 462.

Moreover, video asset classification software code 410 corresponds in general to video asset classification software code 110/210, in FIGS. 1 and 2, and those corresponding features may share the characteristics attributed to any corresponding feature by the present disclosure. That is to say, like video asset classification software code 410, video asset classification software code 110/210 may include modules corresponding to feature analyzer 472, image classifier 474, image cluster segregator 476, and asset classifier 478.

Referring now to FIG. 3 in combination with FIGS. 1, 2, and 4, flowchart 300 begins with receiving video clips 160/460 depicting video assets, each of video clips 160/460 including video segments 462 and annotation metadata 461 (action 360). By way of example, user 140 may utilize user device 150 to interact with content classification system 100 or system 250 in order to generate video asset classifications 168/468. As shown by FIG. 1, user 140 may do so by transmitting video clips 160/460 from user device 150 to content classification system 100 via communication network 108 and network communication links 118. Alternatively, video clips 160/460 may be received from a third party source of video content, or may be stored on system memory 106/256. Video clips 160/460 may be received by video asset classification software code 110/210/410, executed by hardware processor 104/254.

Video clips 160/460 may include respective video segments 462, as well as annotation metadata 461 sparsely describing video segments 462. For example, each video clip of video clips 160/460 may include video segment 462 having multiple images 463 and annotation metadata 461 identifying a start time stamp, an end time stamp, and one or more video assets included in video segment 462. Thus, in some implementations, the video assets being classified using video asset classification software code 110/210/410 may be previously identified video assets having their identities included in annotation metadata 461 carried by video clips 160/460.

It is noted that, as used in the present application, a "video asset" is any key feature included in a video segment that can characterize the video segment for the purposes of classification. In other words, a video asset may include a dramatic character appearing in a video segment (hereinafter "character"), the identity of an actor portraying the character, or an object or location appearing in the video segment. It is further noted that, as used in the present application, an "image" is any individually recognizable feature included in a video frame. That is to say, a single video frame may include multiple images 463, each depicting one of: the face of a character in the frame, a location shown in the frame, and an object appearing in the frame. Moreover, where a frame includes more than one character and/or more than one object, each character and/or each object is depicted respectively by one of images 463.

In addition to time stamp annotation metadata and video asset identification annotation metadata, in some implementations, video clips 160/460 may include annotation metadata 461 identifying the number of shots included in their respective video segment 462. As used in the present application, a "shot" refers to a sequence of frames within video segments 462 that are captured from a unique camera perspective without cuts and/or other cinematic transitions. Thus, video segments 462 carried by video clips 160/460 may include a single shot having multiple frames, or may include multiple shots, with each shot having multiple frames. Furthermore, it is reiterated that a single frame of video segments 462 may include multiple images 463.

Feature analyzer 472 may analyze and detect images 463 within video segments using one or more of "speeded up robust features" (SURF), "scale-invariant feature transform" (SIFT), and/or other techniques. In some implementations, for example, feature analyzer 472 may be used to detect head shots and/or one or more faces included in video segments 462 as images 463. Face detection, for instance, may be accomplished using object recognition, pattern recognition, searching for a specific pattern expected to be present in faces, and/or other image processing techniques.

Flowchart 300 continues with preliminarily classifying images 463 included in video clips 160/460 with one or more of the video assets to produce image clusters 464 (action 362). The preliminary classification of images 463 into image clusters 464 may be performed by video asset classification software code 110/210/410, executed by hardware processor 104/254, and using image classifier 474.

By way of example, where the video assets included in one of video segments 462 are characters including character "A" and character "B", the annotation metadata identifying the video assets may enable video asset classification software code 110/210/410 to identify the respective genders of one or both of characters "A" and "B". As a simplified specific example, where each of video clips 160/460 include images of one or both of characters "A" and "B", and where character "A" is identifiable as a female character and character "B" is identifiable as a male character, images 462 depicting a female character may be clustered and preliminarily classified with character "A", while those images 462 depicting a male character may be clustered and preliminarily classified with character "B".

Alternatively, or in addition to classifying characters based on gender, classification of character images might be based on age, facial features, or features coming from neural networks, for example. It is noted that at the stage of classification corresponding to action 362, all images 463 included in the same image cluster 464 are drawn from the same video segment 462. It is further noted that at the present of classification corresponding to action 362, more than one of image clusters 464 may be preliminarily classified with the same video asset.

Flowchart 300 continues with identifying key features data 465 corresponding respectively to each image cluster 464 (action 364). The identification of key feature data 464 may be performed by video asset classification software code 110/210/410, executed by hardware processor 104/254, and using image classifier 474.

In some implementations, image classifier 474 may be used to determine the relative importance of the features detected in image clusters 464. In some implementations, importance may correspond to the prominence of a character, object, or location in one of images 463 included in a respective image cluster 464, or the role of a character within the image. For example, a role may include one of a speaker, a listener, a primary actor, a secondary actor, a background actor, a temporary or transient actor, or an audience member or spectator, for example.

In some implementations, image classifier 474 may determine the importance of a face based on various features of the given face, for example. In some implementations, one or more features of a face may include the determined relative position, size, and/or angle of a given face respect to the camera capturing the key frame candidate, the state of the mouth and the eyes, and/or whether the face is detected over multiple frames, for example.

As a specific example, image clusters 464 may include images 463 in which one or more characters are speaking, one or more characters are listening, and one or more persons are acting as spectators to the speaking and listening. A given speaker and/or a given listener may be depicted in an image as being positioned closer to the camera relative to the one or more spectators positioned in the background of the video segment. Consequently, the speaker and/or listener may have face sizes that may be relatively larger than the face sizes of the one or more spectators. Image classifier 474 may determine that the detected faces of the speaker and/or listener are of greater importance than the detected faces of the one or more spectators.

In some implementations, key features data 465 may take the form of a feature vector corresponding respectively to each of image clusters 464. For example, in one implementation, key features data 465 may include a mean feature vector for each of image clusters 464. Alternatively, key features data 465 may take the form of any other suitable statistical representation of image clusters 464, such as their respective medoids, for example.

Flowchart 300 continues with segregating image clusters 464 into image super-clusters 466 based on key features data 465 (action 366). Segregation of image clusters 464 into image super-clusters 466 may be performed by video asset classification software code 110/210/410, executed by hardware processor 104/254, and using image cluster segregator 476.

It is noted that each of image super-clusters 466 includes one or more image clusters 464. It is further noted that at the stage of classification corresponding to action 366, image clusters 464 are segregated or grouped into image super-clusters 466 based on their respective key features data 465, rather than based on the video asset with which the images in any image cluster 464 was preliminarily classified in action 362. As a result, any particular image super-cluster 466 may include image clusters 464 preliminarily classified with different video asserts.

Flowchart 300 can conclude with uniquely identifying each of at least some of image super-clusters 466 with one of the video assets included in video clips 160/460 (action 368). It is emphasized that, in contrast to the preliminary classification in which more than one of image clusters 464 may be preliminarily classified with the same video asset, only one of image super-clusters 466 may be classified with any one video asset. Uniquely identifying at least some of image super-clusters 466 with one of the video assets may be performed by video asset classification software code 110/210/410, executed by hardware processor 104/254, and using asset classifier 478, thereby resulting in video asset classifications 168/468.

The unique identification of each of at least some of image super-clusters 466 with one of the video assets included in video clips 160/460 can be performed in a number of different ways. In one implementation, for example, image super-clusters 466 that present very low levels of intra-variance may be rejected. Subsequently, the remaining image super-clusters 466 may be sorted by the size of the biggest image cluster 464 inside of the image super-cluster 466, or by other rules that take into account the similarity of image clusters 464 included in each image super-cluster 466, such as variance.

Thereafter, from the largest to the smallest retained image super-clusters 466, each image super-cluster may be classified according to the preliminary classification appearing most frequently within it, with the proviso that no video asset previously classified with a larger image super-cluster can be classified with a smaller image super-cluster. However, in some instances, in addition to, or as an alternative to, the frequency with which a preliminary classification appears within one of image super-clusters 466, the confidence of the original video assets assigned directly to a frame may be taken into account, as well as statistical measures (e.g., probability of a given video asset given previous unique identification of image super-clusters 466 with respective video assets).

It is noted that each image cluster 464 can bring a set of labels to the super-cluster 466 in to which it is segregated. For example: A first image cluster 464 segregated into a particular image super-cluster 466 brings provisionally identified video assets: A (10 samples), B (5 samples), C (20samples). A second image cluster 464 segregated into the same image super-cluster 466 brings provisionally identified video assets: A (5 samples), C (6 samples). A third image cluster 464 segregated into the same image super-cluster 466 brings provisionally identified video assets: A (I sample), E (2 samples). Different rules can be applied to determine which video asset to uniquely identify with that image super-cluster 466 according to availability (i.e., maybe one video asset has previously been uniquely identified with another image super-cluster 466).

As noted above, exemplary rules may be based on the size of image clusters 464 included in a particular one of image super-clusters 466, or by the frequency with which a preliminary classification appears within the image super-cluster. In addition, prior knowledge can be determinative. For example, if there are multiple reliable preliminary classifications in a particular one of image super-clusters 466 associating that image super-cluster with a particular video asset "A", that image super-cluster may be directly and uniquely identified with video asset "A", and video asset "A" may be excluded from further consideration so that no other image super-cluster 466 can be identified with video asset "A". Thus, in some implementations, uniquely identifying one or more of image super-clusters 466 with one of the video assets included in video clips 160/460 may be based on a confidence value associated with the preliminary classifications producing the image clusters included in the one or more image super-clusters 466.

It is further noted that, subsequent to action 360, actions 362, 364, 366, and 368 (hereinafter "actions 362-368") may be repeated for each distinct type of video asset. For example, actions 362-368 may be performed as a first iteration to uniquely identify image super-clusters 466 with a character appearing in video clips 160/460. Actions 362-368 may be performed again in a second iteration to uniquely identify other image super-clusters 466 with an object or objects appearing in video clips 160/460. Actions 362-368 may be performed yet again in a third iteration to uniquely identify still other image super-clusters 466 with a location appearing in video clips 160/460, and so forth. In other words, the unique identification of each of image super-clusters 466 applies per type of video asset being classified. Repeated iterations of actions 362-368 may result in multiple sets of image super-clusters 466 each uniquely identified with a character, actor, object, or location, for example.

In some implementations, video asset classifications 168/468 can be used to further train video asset classification software code 110/210/410. For example, after a first iteration of the actions outlined in flowchart 300, there may remain image clusters 464 that were rejected in action 368. In those instances, video clips 160/460 may be reused, for example by being re-analyzed using video asset classification software code 110/210/410 and a priori knowledge of video assets included in video clips 160/460 corresponding to video asset classifications 168/468. In other words, in addition to video assets of video clips 160/460 identified by the annotation metadata carried by video clips 160/460, video clips 160/460 may also include unidentified video assets. Moreover, according to various implementations of the present inventive concepts disclosed in the present application, those initially unidentified video assets may advantageously be classified using video asset software code 110/210/410.

Thus, by enabling use of a sparse annotated data set as an initial input, such as a data set of annotation metadata identifying a video clip in terms of a start time stamp, an end time stamp, and specific video assets depicted in the video clip, the present solution can substantially reduce the cost and time required to initiate video asset classification. Moreover, by preliminarily classifying images included in the video clips with one or more of the video assets to produce image clusters, identifying key feature data for each image cluster, and segregating the image clusters into image super-clusters based on the key feature data, the present solution advantageously enables a reliable convergence to an accurate classification of video assets.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content classification system comprising:
a computing platform including a hardware processor and a system memory;
a video asset classification software code stored in the system memory;
the hardware processor configured to execute the video asset classification software code to:
receive a first plurality of video clips depicting a plurality of video assets, each of the video clips including a plurality of images and an annotation metadata;
preliminarily classify the images included in the first plurality of video clips with at least one of the plurality of video assets to produce a plurality of image clusters;
identify a key features data corresponding respectively to each image cluster;
segregate the image clusters into image super-clusters based on the key feature data, each image super-cluster including one or more image clusters; and
uniquely identify each of at least some of the image super-clusters with one of the plurality of video assets.

2. The content classification system of claim 1, wherein uniquely identifying at least one of the image super-clusters with one of the plurality of video assets is based on a confidence value associated with the preliminary classifications producing the one or more image clusters included in the at least one image super-cluster.

3. The content classification system of claim 1, wherein the plurality of video assets depicted in the video clips comprise previously identified video assets.

4. The content classification system of claim 1, wherein at least some of the first plurality of video clips comprise multiple shots.

5. The content classification system of claim 1, wherein more than one of the image clusters can be preliminarily classified with a same one of the plurality of video assets depicted in the video clips.

6. The content classification system of claim 1, wherein the plurality of video assets comprise dramatic characters.

7. The content classification system of claim 1, wherein the plurality of video assets comprise at least one of objects and locations.

8. A method for use by a content classification system including a computing platform having a hardware processor and a system memory storing a video asset classification software code, the method comprising:
receiving, using the hardware processor, a first plurality of video clips depicting a plurality of video assets, each of the video clips including a plurality of images and an annotation metadata;
preliminarily classifying, using the hardware processor, the images included in the first plurality of video clips with at least one of the plurality of video assets to produce a plurality of image clusters;
identifying, using the hardware processor, a key features data corresponding respectively to each image cluster;
segregating, using the hardware processor, the image clusters into image super-clusters based on the key feature data, each image super-cluster including one or more image clusters; and
uniquely identifying, using the hardware processor, each of at least some of the image super-clusters with one of the plurality of video assets.

9. The method of claim 8, wherein uniquely identifying at least one of the image super-clusters with one of the plurality of video assets is based on a confidence value associated with the preliminary classifications producing the one or more image clusters included in the at least one image super-cluster.

10. The method of claim 8, wherein the plurality of video assets depicted in the video clips comprise previously identified video assets.

11. The method of claim 8, wherein at least some of the first plurality of video clips comprise multiple shots.

12. The method of claim 8, wherein more than one of the image clusters can be preliminarily classified with a same one of the plurality of video assets depicted in the video clips.

13. The method of claim 8, wherein the plurality of video assets comprise dramatic characters.

14. The method of claim 8, wherein the plurality of video assets comprise at least one of objects and locations.

15. A computer-readable non-transitory medium having stored thereon instructions, which when executed by a hardware processor, instantiate a method comprising:
receiving a first plurality of video clips depicting a plurality of video assets, each of the video clips including a plurality of images and an annotation metadata;
preliminarily classifying the images included in the first plurality of video clips with at least one of the plurality of video assets to produce a plurality of image clusters;
identifying a key features data corresponding respectively to each image cluster;
segregating the image clusters into image super-clusters based on the key feature data, each image super-cluster including one or more image clusters; and
uniquely identifying each of at least some of the image super-clusters with one of the plurality of video assets.

16. The computer-readable non-transitory medium of claim 15, wherein uniquely identifying at least one of the image super-clusters with one of the plurality of video assets is based on a confidence value associated with the preliminary classifications producing the one or more image clusters included in the at least one image super-cluster.

17. The computer-readable non-transitory medium of claim 15, wherein the plurality of video assets depicted in the video clips comprise previously identified video assets.

18. The computer-readable non-transitory medium of claim 15, wherein at least some of the first plurality of video clips comprise multiple shots.

19. The computer-readable non-transitory medium of claim 15, wherein more than one of the image clusters can be preliminarily classified with a same one of the plurality of video assets depicted in the video clips.

20. The computer-readable non-transitory medium of claim 15, wherein the plurality of video assets comprise at least one of dramatic characters, objects, and locations.

* * * * *